United States Patent [19]

Wills

[11] Patent Number: 4,931,910
[45] Date of Patent: Jun. 5, 1990

[54] LIGHTING DEVICES

[75] Inventor: Kenneth F. Wills, Yeovil, England

[73] Assignee: Saunders-Roe Developments Limited, Middlesex, England

[21] Appl. No.: 315,095

[22] Filed: Feb. 24, 1989

[30] Foreign Application Priority Data

May 6, 1988 [GB] United Kingdom ................ 8812495

[51] Int. Cl.$^5$ .............................................. F21K 2/06
[52] U.S. Cl. ....................................... 362/34; 362/84; 362/252
[58] Field of Search ................... 362/34, 84, 252, 806, 362/249

[56] References Cited

U.S. PATENT DOCUMENTS

| 602,966 | 4/1898 | Wallach | 362/249 |
| 1,560,882 | 11/1925 | Van Horne | 362/249 |
| 3,884,560 | 5/1975 | Neylan et al. | 362/34 |
| 4,184,193 | 1/1980 | Hefferman et al. | 362/34 |

FOREIGN PATENT DOCUMENTS 24380 7/1901 Switzerland ....................... 362/252

*Primary Examiner*—Stephen F. Husar
*Assistant Examiner*—Sue Hagarman
*Attorney, Agent, or Firm*—Larson and Taylor

[57] ABSTRACT

A lighting device comprises a cylindrical light carrier having a plurality of tubular self luminous light sources attached longitudinally along a surface and throughout a major arc of its circumference. In one embodiment the lighting device includes a parabolic reflector.

8 Claims, 1 Drawing Sheet

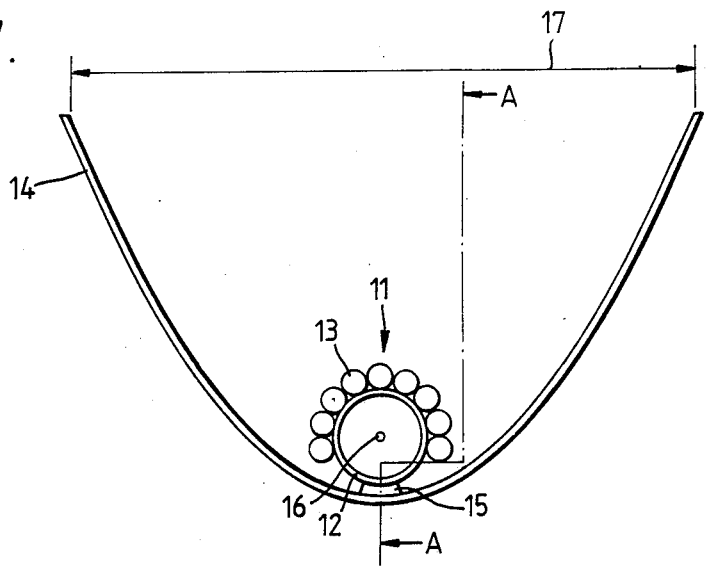
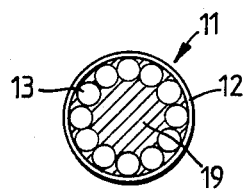
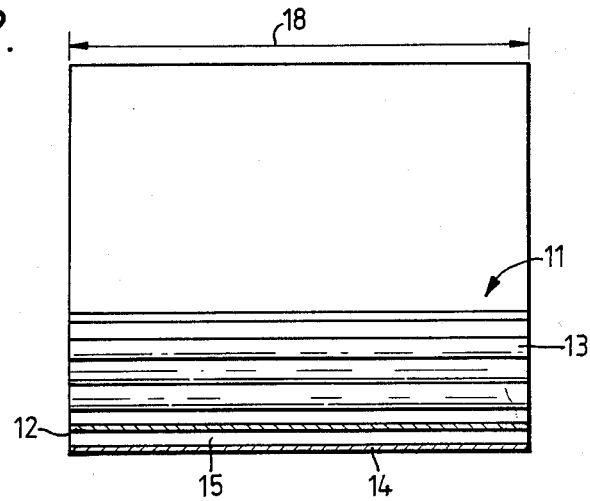

LIGHTING DEVICES

FIELD OF THE INVENTION

This invention relates to lighting devices and is particularly concerned with devices using self luminous light sources in which a phosphor coating within a translucent envelope is excited to luminescence by a gaseous radionucleide such as tritium.

DESCRIPTION OF THE PRIOR ART

Such light sources are manufactured by the applicants under the Trade Mark "BETALIGHT" and Registered Trade Marks "SRDL" and "SRDL BETALIGHT", and are widely used in a range of self luminous signs where a tubular light source is supported along the optical centre of a parabolic reflector.

It is essential to obtain efficient "flashing" of the surface of the parabolic reflector and this requirement dictates the minimum diameter of the self luminous light source depending on the width dimension between the reflector lips. For example, a reflector having a lip width of 19 mm requires a light source having a minimum outside diameter of 5 mm.

The larger the diameter of the light source the greater is the quantity of costly radioactive gas required to provide a useful light intensity, and the problem increases in the consideration of self luminous light sources for use in illuminating large areas. For example, it has been proposed to use self luminous light sources for airport runway markers having an illuminated area up to about 325 square inches.

SUMMARY OF THE INVENTION

Accordingly, in one aspect this invention provides a lighting device comprising a cylindrical light carrier and a plurality of tubular self luminous light sources having a smaller outside diameter than the outside diameter of the carrier attached longitudinally along a surface of the carrier and through at least a major arc of its circumference.

The self luminous light sources may be located on an external surface of the carrier which, preferably is a reflective surface.

Alternatively, the light carrier may comprise a transparent tube and the light sources may be located longitudinally along an internal surface. In such an embodiment the space internally of the self luminous light sources may be filled with a clear adhesive to retain the light sources in position.

The carrier may be supported in a parabolic reflector with a geometral centre of the carrier coincident with an optical centre of the parabola.

In another aspect a lighting device comprises a parabolic reflector having an optical centre, a cylindrical light carrier supported in the reflector with its geometral centre coincident with said optical centre and a plurality of tubular self luminous light sources having a smaller outside diameter than an outside diameter of said carrier attached longitudinally along a surface of the carrier and through at least a major arc of its circumference.

BRIEF DESCRIPTION OF THE DRAWINGS

The invention will now be described by way of example only and with reference to the accompanying drawings in which, FIG. 1 is an end view of a lighting device constructed according to one embodiment of the invention, FIG. 2 is a fragmentary side elevation taken along lines A—A of FIG. 1, and FIG. 3 is a fragmentary end view similar to FIG. 1 showing an alternative embodiment.

DETAILED DESCRIPTION OF THE DRAWINGS

Referring now to FIGS. 1 and 2, a lighting device 11 includes a cylindrical light carrier comprising a glass tube 12 having a reflective external surface. Nine tubular self luminous light sources 13 are adhered using a white silicon adhesive longitudinally of the external surface of the carrier 12 and through a major arc of the circumference of its external surface.

In the illustrated embodiment the lighting device 11 is used with a parabolic reflector 14 having a lip width dimension 17 and a length 18. The device 11 is attached by an adhesive 15 internally of the reflector 14 so that a geometral centre of the carrier 12 is located coincident with the optical centre 16 of the parabola.

Each of the nine self luminous light sources has an outside diameter of 5 mm requiring a total of 210 curie of tritium to provide the required intensity of light output. It is estimated that to provide a comparable light intensity over a similar area using a single annular self luminous light source would require about 270 curie, indicating that a useful saving is achieved by this invention.

In the embodiment of FIG. 3 the tubular self luminous light sources 13 are located internally of the tubular glass carrier 12. In such an arrangement in which the light sources 13 are located entirely around the internal surface they are self supporting and can be retained simply by filling the space 19 internally of the light sources with a clear silicon adhesive.

The actual diameter of the light carrier 12 in or on which the individual array of self luminous light sources 13 are mounted and the number of light sources 13 used will depend on the particular installation. It is envisaged also that the lighting device 11 could be used in certain installations independently of the illustrated parabolic reflector in which case the individual light sources 13 may be extended entirely around the external or internal diameter of the carrier 12.

In either case it is preferred that to effect maximum savings the external diameter of the individual self luminous light sources 13 does not exceed about 5 mm.

Apart from achieving a useful saving in the amount of gaseous radionucleide required to provide a desired light intensity over a given area the lighting device of this invention improves safety in that in the event of impact damage a proportion only of the full complement of gas may be released into the atmosphere. In addition, in an embodiment in which the individual light sources 13 are releasably attached to the carrier 12, it is possible to effect repair by replacement of one or more damaged light sources 13.

Whilst several embodiments of the invention have been described and illustrated it will be apparent that many modifications may be made without departing from the scope of the invention as defined in the appended claims. For example, the light carrier 12 may be manufactured of any other suitable material such as a plastics material, aluminium or rubber, and may be formed with longitudinally extending grooves to facilitate assembly of the individual light sources 13. In some applications it may be possible to arrange the light sources 13 circumferentially spaced-apart to reduce the required number and effect a further saving of gaseous radionucleide in the assembly.

What is claimed is:

1. A lighting device comprising a light carrier of tubular form defining an internal cylindrical surface and an external cylindrical surface, and a plurality of tubular self luminous light sources each having a smaller outside diameter than the outside diameter of the tubular carrier attached longitudinally along one of said cylindrical surfaces of the carrier and through at least a major arc of the circumference of said one surface.

2. A lighting device as claimed in claim 1, wherein the light sources are located on the external surface of the tubular carrier.

3. A light device as claimed in claim 2, wherein the external surface is a reflective surface.

4. A lighting device as claimed in claim 1, wherein the light sources are located longitudinally along the internal surface of the tubular carrier.

5. A lighting device as claimed in claim 4, wherein said light sources are retained by clear adhesive in a space internally of the light carrier.

6. A lighting device as claimed in claim 1, wherein the tubular carrier is supported in a parabolic reflector with a geometral centre of the carrier coincident with an optical centre of the parabola.

7. A lighting device as claimed in claim 1, wherein said light sources are disposed in contiguous array along said one surface of said tubular carrier.

8. A lighting device comprising a parabolic reflector having an optical centre, a transparent light carrier of tubular form supported in the reflector with its geometral centre coincident with said optical centre, and a plurality of tubular self luminous light sources having a smaller outside diameter than an outside diameter of said tubular carrier attached longitudinally along a surface of the carrier and through at least a major arc of its circumference.

* * * * *